(12) United States Patent
Jiang

(10) Patent No.: US 11,321,045 B2
(45) Date of Patent: May 3, 2022

(54) SERVICE PROCESSING METHOD AND APPARATUS FOR SMART SOUND BOX, AND SMART SOUND BOX

(71) Applicant: Baidu Online Network Technology (Beijing) Co., Ltd., Beijing (CN)

(72) Inventor: Xufei Jiang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 98 days.

(21) Appl. No.: 16/516,022

(22) Filed: Jul. 18, 2019

(65) Prior Publication Data

US 2019/0339933 A1 Nov. 7, 2019

(30) Foreign Application Priority Data

Sep. 7, 2018 (CN) .......................... 201811044189.9

(51) Int. Cl.
*G06F 3/16* (2006.01)
*H04W 4/50* (2018.01)

(52) U.S. Cl.
CPC .............. *G06F 3/165* (2013.01); *G06F 3/167* (2013.01); *H04W 4/50* (2018.02)

(58) Field of Classification Search
CPC ............ G06F 3/165; G06F 3/167; G06F 3/16; H04W 4/50; G10L 15/22; G10L 15/26; G10L 15/30; H04M 2201/40
See application file for complete search history.

(56) References Cited

U.S. PATENT DOCUMENTS

2009/0191854 A1* 7/2009 Beason ............. H04M 1/72448
                                                    455/418
2014/0223441 A1* 8/2014 Banda ....................... G06F 9/48
                                                    718/102

(Continued)

FOREIGN PATENT DOCUMENTS

CN      107492374 A     12/2017
CN      108039172 A      5/2018
(Continued)

OTHER PUBLICATIONS

First Office Action of Priority Application No. 201811044189.9 dated Aug. 22, 2019; 9 pages.

(Continued)

*Primary Examiner* — Fan S Tsang
*Assistant Examiner* — David Siegel
(74) *Attorney, Agent, or Firm* — Pearne & Gordon LLP

(57) ABSTRACT

A service processing method and apparatus for a smart sound box, and a smart sound box are provided. The method includes: obtaining a service running request instruction; determining, according to the service running request instruction, a first service that the service running request instruction instructs to run; and if the smart sound box runs a second service in foreground and the first service is different from the second service, obtaining a service type of the first service and a service type of the second service, and controlling, according to the service type of the first service and the service type of the second service, the smart sound box to run at least one of the first service and the second service. Using the method provided in the present disclosure, the service processing logic is simplified and the difficulty of implementation is reduced.

16 Claims, 2 Drawing Sheets

(56) References Cited

U.S. PATENT DOCUMENTS

| | | | | |
|---|---|---|---|---|
| 2015/0160976 | A1* | 6/2015 | Kim | G06F 9/4881 |
| | | | | 718/108 |
| 2017/0068423 | A1* | 3/2017 | Napolitano | G06F 16/489 |
| 2018/0041809 | A1* | 2/2018 | Chang | H04N 21/2662 |

FOREIGN PATENT DOCUMENTS

| | | | |
|---|---|---|---|
| CN | 108184204 A | | 6/2018 |
| CN | 108271096 A | | 7/2018 |
| CN | 108337138 A | | 7/2018 |
| JP | 2005107287 A | | 4/2005 |
| JP | 2013171312 A | | 9/2013 |
| JP | 2013171312 A | * | 9/2013 |
| JP | 2014003609 A | | 1/2014 |
| JP | 2017535823 A | | 11/2017 |
| JP | 2018502345 A | | 1/2018 |
| WO | 2016033269 A1 | | 3/2016 |

OTHER PUBLICATIONS https://baike.baidu.com/item/%E5%A4%A9%E7%8C%AB%E7%B2%BE%E7%81%B5X1/21524509?fr=aladdin&ivk_sa=1022817p.

Notice of Allowance of the priority application No. 201811044189.9 dated Mar. 12, 2020; 2 pages.

The first OA of the parallel JP application No. 2019-125705; 4 pages.

CNBLUSP201904563—the Notice of Allowance of the parallel JP application dated Mar. 16, 2021; 3 pages.

* cited by examiner

SERVICE PROCESSING METHOD AND APPARATUS FOR SMART SOUND BOX, AND SMART SOUND BOX

CROSS-REFERENCE TO RELATED APPLICATIONS

This application claims priority to Chinese Patent Application No. 201811044189.9, filed on Sep. 7, 2018 and entitled "SERVICE PROCESSING METHOD AND APPARATUS FOR SMART SOUND BOX, AND SMART SOUND BOX", which is hereby incorporated by reference in its entirety.

TECHNICAL FIELD

The present disclosure relates to the field of artificial intelligence technologies and, in particular, to a service processing method and apparatus for a smart sound box, and a smart sound box.

BACKGROUND

Artificial intelligence is a new technical science for researching and developing theories, methods, techniques and application systems for simulating, extending and expanding human intelligence. Artificial intelligence is a branch of computer science that attempts to understand the essence of intelligence and to produce a new intelligent machine capable of reacting in a similar manner to human intelligence. For example, a smart sound box.

A smart sound box typically includes a display screen and a sound box. The sound box includes a plurality of microphones or microphone matrices for collecting voice instructions. The smart sound box can obtain corresponding information according to voice instructions and display the same to a user via the display screen. The smart sound box is equipped with powerful content ecology and social system. On the basis of voice interaction, the smart sound box can easily cope with services in a variety of interactive scenarios, such as storytelling, learning courses, watching movies, listening to music, making video calls, map search, photo album display, and control of other smart home devices, so as to meet the user's needs. For example, the user gives a voice instruction "Listen to music". After obtaining the voice instruction, the smart sound box can play music and display a music play interface on the display screen.

However, the user's needs are random and diversified. For example, when the smart sound box is playing music, the user may want to ask about the weather. At present, there are various methods for processing concurrent services, and different services lead to different processing methods. As a result, the service processing logic is complicated and very difficult to implement.

SUMMARY

The present disclosure provides a service processing method and apparatus for a smart sound box, and a smart sound box, which simplify service processing logic and reduce difficulty of implementation.

According to a first aspect, the present disclosure provides a service processing method for a smart sound box, including:

obtaining a service running request instruction;

determining, according to the service running request instruction, a first service that the service running request instruction instructs to run; and if the smart sound box runs a second service in foreground and the first service is different from the second service, obtaining a service type of the first service and a service type of the second service, and controlling, according to the service type of the first service and the service type of the second service, the smart sound box to run at least one of the first service and the second service.

Optionally, in a possible implementation of the first aspect, the controlling, according to the service type of the first service and the service type of the second service, the smart sound box to run at least one of the first service and the second service includes:

controlling, according to the service type of the first service, the service type of the second service, and a correspondence between a preset service type and a service running mode, the smart sound box to run at least one of the first service and the second service.

Optionally, in a possible implementation of the first aspect, the service type includes at least two of the following:

a video service type for indicating a service for playing video;

an audio service type for indicating a service for playing audio;

a query service type for indicating a service for playing a query result; and a trigger service type for indicating a service that is automatically run in the foreground after a preset service running condition is triggered.

Optionally, in a possible implementation of the first aspect, if the service type of the first service and the service type of the second service are any one of the video service type and the audio service type, or, if the service type of the first service is any one of the video service type, the audio service type and the query service type, and the service type of the second service is the query service type, the determining a running mode of the first service and the second service includes:

stopping running the second service (i.e. closing the second service), and running the first service in the foreground.

Optionally, in a possible implementation of the first aspect, if the service type of the first service is the query service type, and the service type of the second service is the video service type or the audio service type, the determining a running mode of the first service and the second service includes:

converting the second service from being run in the foreground to being run in background;

starting to run the first service, and controlling the smart sound box to output a service running result of the first service and then stop running the first service; and converting the second service from being run in the background to being run in the foreground.

Optionally, in a possible implementation of the first aspect, after the converting the second service from being run in the foreground to being run in background, the method further includes:

lowering a playback volume of a sound emitting device of the smart sound box;

after the converting the second service from being run in the background to being run in the foreground, the method further includes:

restoring the playback volume of the sound emitting device.

Optionally, in a possible implementation of the first aspect, if the service type of the first service is the trigger service type, and the service type of the second service is the video service type, the audio service type or the query service type, the determining a running mode of the first service and the second service includes:

converting the second service from being run in the foreground to being run in background in a cache way;

running the first service in the foreground, and controlling the smart sound box to output a service running result of the first service;

stopping running the first service when a preset service stop running condition of the first service is satisfied; and converting the second service from being run in the background in the cache way to being run in the foreground.

Optionally, in a possible implementation of the first aspect, after the determining a running mode of the first service and the second service according to the service type of the first service and the service type of the second service, the method further includes:

determining, according to a service type of a service that is run in the foreground of the smart sound box as well as a relationship between a preset service type and a service exit duration, a service exit duration corresponding to the service that is run in the foreground of the smart sound box; and if no instruction inputted by a user is obtained within the service exit duration, stopping running the service that is run in the foreground of the smart sound box.

According to a second aspect, the present disclosure provides a service processing apparatus for a smart sound box, including:

an obtaining module, configured to obtain a service running request instruction;

a service determining module, configured to determine, according to the service running request instruction, a first service that the service running request instruction instructs to run; and a service running module, configured to, if the smart sound box runs a second service in foreground and the first service is different from the second service, obtain a service type of the first service and a service type of the second service, and control, is according to the service type of the first service and the service type of the second service, the smart sound box to run at least one of the first service and the second service.

Optionally, in a possible implementation of the second aspect, the service running module is specifically configured to:

control, according to the service type of the first service, the service type of the second service, and a correspondence between a preset service type and a service running mode, the smart sound box to run at least one of the first service and the second service.

Optionally, in a possible implementation of the second aspect, the service type includes at least two of the following:

a video service type for indicating a service for playing video;

an audio service type for indicating a service for playing audio;

a query service type for indicating a service for playing a query result; and a trigger service type for indicating a service that is automatically run in the foreground after a preset service running condition is triggered.

Optionally, in a possible implementation of the second aspect, if the service type of the first service and the service type of the second service are any one of the video service type and the audio service type, or, if the service type of the first service is any one of the video service type, the audio service type and the query service type, and the service type of the second service is the query service type, the service running module is specifically configured to:

stop running the second service, and run the first service in the foreground.

Optionally, in a possible implementation of the second aspect, if the service type of the first service is the query service type, and the service type of the second service is the video service type or the audio service type, the service running module is specifically configured to:

convert the second service from being run in the foreground to being run in background;

start to run the first service, and control the smart sound box to output a service running result of the first service and then stop running the first service; and convert the second service from being run in the background to being run in the foreground.

Optionally, in a possible implementation of the second aspect, the service running module is further configured to:

lower a playback volume of a sound emitting device of the smart sound box; and restore the playback volume of the sound emitting device.

Optionally, in a possible implementation of the second aspect, if the service type of the first service is the trigger service type, and the service type of the second service is the video service type, the audio service type or the query service type, the service running module is specifically configured to:

convert the second service from being run in the foreground to being run in background in a cache way;

run the first service in the foreground, and control the smart sound box to output a service running result of the first service;

stop running the first service when a preset service stop running condition of the first service is satisfied; and convert the second service from being run in the background in the cache way to being run in the foreground.

Optionally, in a possible implementation of the second aspect, the service running module is further configured to:

determine, according to a service type of a service that is run in the foreground of the smart sound box as well as a relationship between a preset service type and a service exit duration, a service exit duration corresponding to the service that is run in the foreground of the smart sound box; and if no instruction inputted by a user is obtained within the service exit duration, stop running the service that is run in the foreground of the smart sound box.

According to a third aspect, the present disclosure provides a smart sound box, including a memory and a processor. The memory is configured to store program instructions; the processor is configured to execute the instructions stored in the memory, so that the smart sound box implements the service processing method for the smart sound box provided by any implementation of the first aspect.

According to a fourth aspect, the present disclosure provides a storage medium, including a readable storage medium and a computer program, where the computer program is used for implementing the service processing method for the smart sound box provided by any implementation of the first aspect.

According to a fifth aspect, the present disclosure provides a program product, including a computer program (i.e., executive instructions) stored in a readable storage medium. A processor can read the computer program from the readable storage medium, and the processor executes the computer program for executing the service processing method for the smart sound box provided by any implementation of the first aspect.

The present disclosure provides a service processing method and apparatus for a smart sound box, and a smart sound box. A service running request instruction is obtained; a first service that a service running request instruction instructs to run is determined according to the service running request instruction; and if the smart sound box runs a second service in foreground and the first service is different from the second service, the service type of the first service and the service type of the second service are obtained, and the smart sound box is controlled to run at least one of the first service and the second service according to the service type of the first service and the service type of the second service. Since the smart sound box is controlled to run at least one of the two services according to the service types of the two services, the service processing logic is simplified, and the difficulty of implementation is reduced.

BRIEF DESCRIPTION OF THE DRAWINGS

In order to illustrate the technical solutions in embodiments of the present disclosure or the prior art more clearly, accompanying drawings used for description of the embodiments or the prior art will be briefly described hereunder. Obviously, the following described drawings are merely some embodiments of the present disclosure. For persons skilled in the art, other drawings may be obtained based on these drawings without creative effort.

DESCRIPTION OF EMBODIMENTS

In order to make the objects, technical solutions and advantages of embodiments of the present disclosure clearer, the technical solutions in embodiments of the present disclosure will be described hereunder clearly and completely with reference to the accompanying drawings in the embodiments of the present disclosure. Obviously, the described embodiments are only a part of embodiments of the present disclosure, rather than all embodiments thereof. All other embodiments obtained by persons of ordinary skill in the art based on the embodiments of the present disclosure without any creative effort shall fall into the protection scope of the present disclosure.

Figure 1:
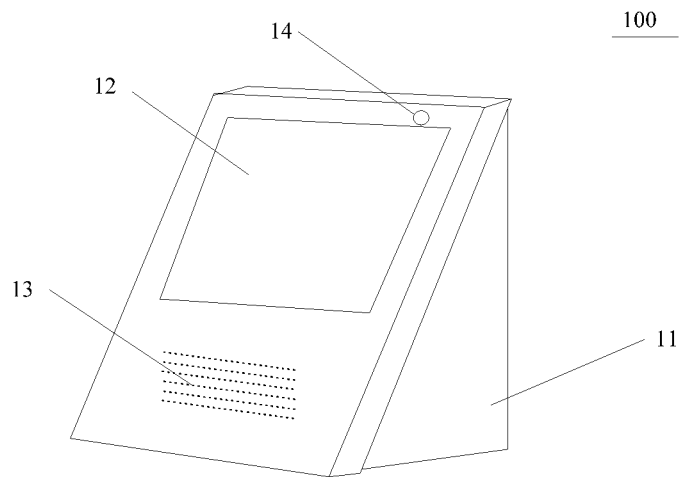
FIG. 1 is a schematic structural diagram of a smart sound box to which the present disclosure is applicable.

FIG. 1 is a schematic structural diagram of a smart sound box to which the present disclosure is applicable. As shown in FIG. 1, a smart sound box 100 can include a housing 11; a display screen 12 disposed on the housing 11; a processor, a memory, a sound collecting device, a sound emitting device, a transceiver (which are not shown) and the like that are disposed inside the housing 11. The sound collecting device is configured to obtain a voice signal inputted by a user. Thus, the processor can process the voice signal and output a service running result through the display screen 12 and/or the sound emitting device, thereby providing a corresponding service to the user. The transceiver is used to communicate with other devices. For example, the user asks about "today's weather". The smart sound box obtains the corresponding voice signal, and can display weather information on the display screen 12 to the user.

Optionally, the display screen 12 may be a touch display screen. Optionally, the sound collecting device may be a microphone array or a plurality of microphones. Optionally, the sound emitting device may include at least one loudspeaker. A sound play hole 13 may be provided on the housing 11 at a position corresponding to the loudspeaker. Optionally, the housing 11 may also be provided with a camera 14 for face recognition, video calls, and the like.

It should be noted that the shape of the smart sound box, the material of the housing 11, as well as the types, models and implementations of the devices or modules disposed inside the housing 11 are not limited in the present disclosure.

It should be noted that the service processing method for the smart sound box provided in the present disclosure may be applicable to a smart sound box, or may be applicable to other devices with artificial intelligence which have similar software and/or hardware structures. The type of the devices with artificial intelligence is not limited in the present disclosure. In embodiments of the present disclosure, the description is made exemplarily by taking a smart sound box as an example of the devices with artificial intelligence.

Figure 2:
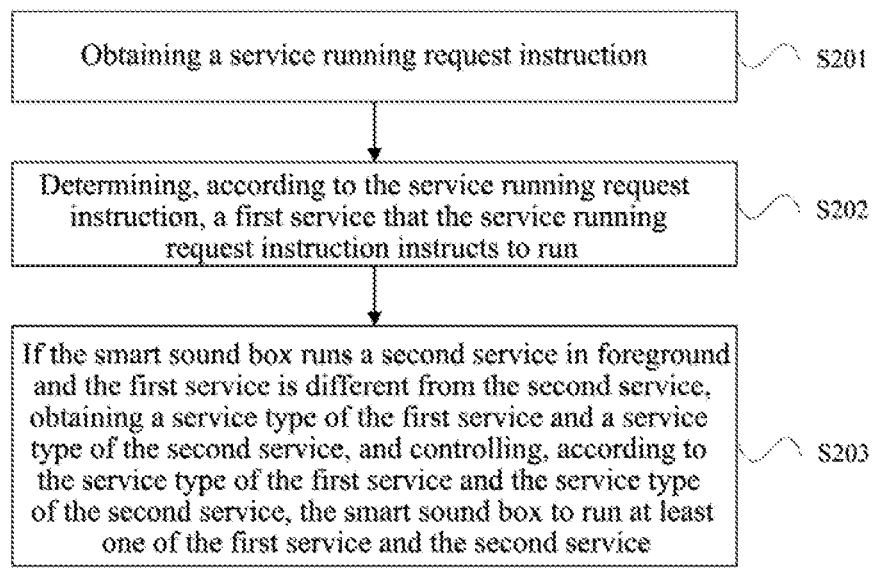
FIG. 2 is a flowchart of a service processing method for a smart sound box according to an embodiment of the present disclosure.

FIG. 2 is a flowchart of a service processing method for a smart sound box according to an embodiment of the present disclosure. As shown in FIG. 2, in the service processing method for the smart sound box provided in this embodiment, the executive entity may be a service processing apparatus for a smart sound box or may be a smart sound box. As shown in FIG. 2, the service processing method for the smart sound box provided in this embodiment can include the following steps.

S201, obtaining a service running request instruction.

The service running request instruction is used to request a service to be run. The service refers to an activity that can be provided to a user by the smart sound box to meet the user's needs, and is implemented by running program codes stored in the smart sound box. For example, movie play, short video play, storytelling, course learning, music listening, cross talk listening, a map search, a weather query, an encyclopedia query, a poem query, a picture browse, control of other smart home devices, a video call, an alarm clock, and the like. The classification of services is not limited in this embodiment. For example, in some scenarios, the poem query and the entry meaning query are defined as two different services. In other scenarios, the poem query and the entry meaning query are defined as the same one service, which is defined as a different service from the weather query.

Optionally, the service may be set with attribute information. The attribute information of the service may include any one of a service name, a service identifier, and description information of the service.

For different services and different application scenarios, the service running request instruction may be obtained in different ways.

Optionally, in S201, the obtaining a service running request instruction may include:

obtaining a voice instruction inputted by the user via the sound collecting device of the smart sound box.

The description below will be given in combination with specific services and application scenarios. For example, when the user wants to listen to a song, the user may say "I want to hear XX". When the user wants to learn a course, the user may say "Open XX course". When the user wants to know the weather today, the user may say "The weather today". When the user wants to set up a reminder, the user may say "Remind me to the airport at 8 a.m.". In each of the above scenarios, the smart sound box can obtain a voice instruction inputted by the user via the sound collecting device, and the voice instruction indicates a request to run a corresponding service.

Optionally, in S201, the obtaining a service running request instruction may include:

obtaining the service running request instruction via the transceiver of the smart sound box.

The description below will be given in combination with specific services and application scenarios. For example, when a user A makes a video call to a user B, the smart sound box may receive a wireless signal via the transceiver. The wireless signal is the service running request instruction for requesting a video call service to be run.

Optionally, in S201, the obtaining a service running request instruction may include:

obtaining the service running request instruction via a display screen of the smart sound box.

The description below will be given in combination with specific services and application scenarios. For example, the user needs to query the meaning of an entry A. The display screen of the smart sound box displays the meaning of the entry A to the user. An entry B appears in the meaning of the entry A. The user touches the display screen at the position where the entry B is. At this time, the smart sound box can obtain the service running request instruction via the display screen, and the service running request instruction is used to request a run query service to display the meaning of the entry B for the user.

Optionally, in S201, the obtaining a service running request instruction may include:

obtaining the service running request instruction when a preset service running condition of the service is triggered.

The description below will be given in combination with specific services and application scenarios. For example, the user has requested to set a reminder at 4:00 p.m. yesterday, and the reminder content was "Remind me to go to the airport at 8:00 a.m.". A preset service running condition of an alarm clock service is triggered at 8:00 a.m. today, and then the service running request instruction can be obtained. The service running request instruction is used to request an alarm clock service to be run.

S202, determining, according to the service running request instruction, a first service that the service running request instruction instructs to run.

Specifically, service running request instructions are obtained in different ways, the service running request instructions have different content, and methods for determining, according to the service running request instructions, services that the service running request instruction instruct to run are different. Please refer to the existing methods for processing different services, which is not particularly limited in this embodiment. For example, a video call service may be determined according to a communication protocol, and an alarm clock service may be determined according to a timing algorithm.

S203, if the smart sound box runs a second service in foreground and the first service is different from the second service, obtaining a service type of the first service and a service type of the second service, and controlling, according to the service type of the first service and the service type of the second service, the smart sound box to run at least one of the first service and the second service.

Specifically, in this embodiment, the service that is being run in the foreground of the smart sound box at the current time may be referred to as the second service. At this time, the service that is requested to be run by obtaining the service running request instruction may be referred to as the first service. The running in the foreground means that the service is being run, and a service running result can be displayed on the display screen. For example, the smart sound box is playing a movie currently, and if the user wants to ask for time, the second service is a video play service, and the first service is a time query service. At this time, the first service is different from the second service. For another example, the display screen of the smart sound box currently displays the meaning of an entry A. If the user wants to query the meaning of an entry B, the second service is an entry query service and the first service is the entry query service. At this time, the first service is the same as the second service. For another example, the display screen of the smart sound box currently displays the meaning of the entry A. If the user wants to query the weather, the second service is the entry query service, and the first service is a weather query service. At this time, the first service is different from the second service.

When the smart sound box runs the second service in the foreground and requests the first service to be run, and the first service is different from the second service, the smart sound box can be controlled to run at least one of the first service and the second service according to the service type of the first service and the service type of the second service. The service types may be the same for different services. For example, the entry query service and the weather query service are different. However, the service types of the entry query service and the weather query service may be the same, for example, both are query service types. For another example, a cross talk listening service and a storytelling service are different. However, the service types of the cross talk listening service and the storytelling service may be the same, for example, both are audio service types. It should be noted that the service type of the service is not limited in this embodiment, and a correspondence between a preset service and the service type may be stored in the smart sound box in advance.

It can be seen that, according to the service processing method for the smart sound box provided in this embodiment, when the smart sound box runs a service in the foreground, and a new service is requested to be run at this time, the smart sound box can be controlled to run at least one of the two services according to the service types of the two services, thereby avoiding setting a task manager, simplifying service processing logic, and reducing difficulty of implementation.

Optionally, the preset service type includes at least two of the following:

a video service type for indicating a service for playing video;

an audio service type for indicating a service for playing audio;

a query service type for indicating a service for playing a query result; and a trigger service type for indicating a service that is automatically run in the foreground after a preset service running condition is triggered.

The description below will be given by way of example.

For example, a service corresponding to the video service type may include at least one of movie play and short video play. A service corresponding to the audio service type may include at least one of storytelling, course learning, music listening and cross talk listening. A service corresponding to the query service type may include at least one of a map search, a weather query, an encyclopedia query, a poem query, a picture browse, and control of other smart home devices. A service corresponding to the trigger service type may include at least one of a video call and an alarm clock.

Optionally, in S203, the obtaining a service type of the first service and a service type of the second service may include:

obtaining service identifiers of the first service and the second service;

obtaining the service type of the first service and the service type of the second service according to the service identifiers of the first service and the second service as well as a correspondence between a preset service identifier and the service type.

Specifically, the smart sound box may store in advance service identifiers of different services and the correspondence between the preset service identifier and the service type. According to the correspondence, the service type of the first service can be obtained according to the service identifier of the first service, and the service type of the second service can be obtained according to the service identifier of the second service.

It should be noted that the implementation of the service identifier is not limited in this embodiment. For example, it may be numbers, letters, or a combination of numbers and letters.

Optionally, in S203, the controlling, according to the service type of the first service and the service type of the second service, the smart sound box to run at least one of the first service and the second service may include:

controlling, according to the service type of the first service, the service type of the second service, and a correspondence between a preset service type and a service running mode, the smart sound box to run at least one of the first service and the second service.

Specifically, the correspondence between the preset service type and the service running mode may be stored in the smart sound box in advance. According to this correspondence, the smart sound box can be controlled to run at least one of the first service and the second service according to the service type of the first service and the service type of the second service.

The description below will be given by way of example. See Table 1. Table 1 shows a correspondence between the preset service type and the service running mode.

TABLE 1

| Service Type of Second Service | Service Type of First Service | Control Service Running |
|---|---|---|
| Video Service Type/Audio Service Type Query Service Type | Video Service Type/Audio Service Type Video Service Type/Audio Service Type/Query Service Type | Stop running the second service, and run the first service in the foreground |
| Video Service Type/Audio Service Type | Query Service Type | Convert the second service from being run in the foreground to being run in the background. Start to run the first service, and output a service running result of the first service. Thereafter, stop running the first service. Convert the second service from being run in the background to being run in the foreground. |
| Audio Service Type | Query Service Type | Convert the second service from being run in the foreground to being run in the background in a cache way. Start to run the first service, and output a service running result of the first service. Thereafter, stop running the first service. Convert the second service from being run in the background in the cache way to being run in the foreground. |
| Video Service Type/Audio Service Type/Query Service Type | Trigger Service Type | Convert the second service from being run in the foreground to being run in the background in a cache way. Run the first service in the foreground, and output a service running result of the first service. Thereafter, stop running the first service. Convert the second service from being run in the background in the cache way to being run in the foreground. |
| Video Service Type/Audio Service Type/Query Service Type | Trigger Service Type | Convert the second service from being run in the foreground to being run in the background in a cache way, and lower a playback volume of the sound emitting device of the smart sound box. Run the first service in the foreground, and output a service running result of the first service. Thereafter, stop running the first service. Convert the second service from being run in the background in the cache way to being run in the foreground. |

The running in the background means that the service is running, but the service running result is not displayed on the display screen. If audio data is included in the service running result, then it may be played by the sound emitting device. The running in the background in the cache way means that the service is suspended and the service running result will not be generated, but buffer data is stored to facilitate the restoration of the service running.

Optionally, a preset service type, a correspondence between a preset service identifier and a service type, and a correspondence between a preset service type and a service running mode may be periodically updated or an event-triggered update.

Optionally, if the service type of the first service and the service type of the second service are any one of the video service type and the audio service type, or, if the service type of the first service is any one of the video service type, the audio service type and the query service type, and the service type of the second service is the query service type, in S203, determine the running mode of the first service and the second service, which includes:

stopping running the second service, and running the first service in the foreground.

The description below will be given by way of example.

In an example, the second service is a storytelling service, and the first service is a music listening service. Then, the storytelling service is closed, and the music listening service is run in the foreground. A song playback interface will be displayed on the display screen of the smart sound box.

In another example, the second service is a movie play service, and the first service is a song listening service. Then, the movie play service is closed, and the music listening service is run in the foreground. A song playback interface will be displayed on the display screen of the smart sound box.

In yet another example, the second service is a weather query service, and the first service is a movie play service. Then, the weather query service is closed, and the movie play service is run in the foreground. A movie play interface will be displayed on the display screen of the smart sound box.

In yet another example, the second service is a weather query service, and the first service is an entry query service. Then, the weather query service is closed, and the entry query service is run in the foreground. Information related to the queried entry will be displayed on the display screen of the smart sound box.

Optionally, if the service type of the first service is the query service type, and the service type of the second service is the video service type or the audio service type, in S203, determine the running mode of the first service and the second service, which includes:

converting the second service from being run in the foreground to being run in the background;

starting to run the first service, and controlling the smart sound box to output the service running result of the first service and then stop running the first service;

converting the second service from being run in the background to being run in the foreground.

Optionally, the controlling the smart sound box to output the service running result of the first service may include:

controlling the sound emitting device and/or the display screen of the smart sound box to output the service running result of the first service.

The description below will be given by way of example.

For example, the second service is a music listening service, and the first service is a weather query service. Then the music listening service is converted from being run in the foreground to being run in the background. At this time, a music play interface is not displayed on the display screen of the smart sound box. The sound emitting device of the smart sound box can continue playing music. The weather query service is started to run, and a weather query result can be displayed on the display screen of the smart sound box. Thereafter, the running of the weather query service is stopped. The music listening service is converted from being run in the background to being run in the foreground. At this time, the music play interface will be displayed on the display screen of the smart sound box. The sound emitting device of the smart sound box continuous playing music.

Optionally, after converting the second service from being run in the foreground to being run in the background, the method further includes:

lowering the playback volume of the sound emitting device of the smart sound box.

After converting the second service from being run in the background to being run in the foreground, the method further includes:

restoring the playback volume of the sound emitting device.

The description below will be given by way of example.

The second service is also described by taking a music listening service as an example, and the first service is described by taking a weather query service as an example. After the music listening service is converted from being run in the foreground to being run in the background, the playback volume of the sound emitting device of the smart sound box can be lowered, thereby avoiding interference with the user's obtaining of a weather query result. After the music listening service is converted from being run in the background to being run in the foreground, the playback volume of the sound emitting device can be restored.

Optionally, if the service type of the first service is the trigger service type, and the service type of the second service is the video service type, the audio service type or the query service type, in S203, determine the running mode of the first service and the second service, which includes:

converting the second service from being run in the foreground to being run in background in a cache way;

running the first service in the foreground, and controlling the smart sound box to output a service running result of the first service;

stopping running the first service when a preset service stop running condition of the first service is satisfied; and converting the second service from being run in the background in the cache way to being run in the foreground.

The description below will be given by way of example.

For example, the second service is a music listening service, and the first service is a video call service. Then, the music listening service is converted from being run in the foreground to being run in the background in the cache way. At this time, a music play interface is not displayed on the display screen of the smart sound box. The sound emitting device of the smart sound box does not play music. The video call service is run in the foreground, and a video call interface can be displayed on the display screen of the smart sound box. When the user manually terminates the video call through the touch screen, or the smart sound box obtains a voice signal of the user through the sound collecting device, the voice signal instructing to terminate the video call, the running of the video call service is stopped. The music listening service is converted from being run in the background in the cache way to being run in the foreground. At this time, the music play interface will be displayed on the display screen of the smart sound box. The sound emitting device of the smart sound box will continue playing music.

Optionally, after determining the running mode of the first service and the second service according to the service type of the first service and the service type of the second service, the method can further include:

determining, according to the service type of the service that is run in the foreground of the smart sound box as well as a relationship between the preset service type and a service exit duration, a service exit duration corresponding to the service that is run in the foreground of the smart sound box; and if no instruction inputted by the user is obtained within the service exit duration, stopping running the service that is run in the foreground of the smart sound box.

Specifically, for a service that is run in the foreground, if no signal is received within a preset period of time, the smart sound box can actively stop running the service. The preset period of time may be referred to as the service exit duration. In this embodiment, at least one service of the same service type corresponds to the same service exit duration. For example, for the storytelling service, the music listening service, and the cross talk listening service, the service exit duration is the same. If no instruction inputted by the user is obtained within the service exit duration, the running of the service that is run in the foreground of the smart sound box is stopped. The running resources of the smart sound box are saved, and energy consumption is reduced.

It should be noted that the specific value of the service exit duration corresponding to different service types is not limited in this embodiment.

This embodiment provides a service processing method for a smart sound box, including: obtaining a service running request instruction; determining, according to the service running request instruction, a first service that the service running request instruction instructs to run; and if the smart sound box runs a second service in foreground and the first service is different from the second service, obtaining a service type of the first service and a service type of the second service, and controlling, according to the service type of the first service and the service type of the second service, the smart sound box to run at least one of the first service and the second service. According to the service processing method for the smart sound box provided in this embodiment, when the smart sound box runs a service in the foreground, and a new service is requested to be run at this time, the smart sound box can be controlled to run at least one of the two services according to the service types of the two services, thereby avoiding setting a task manager, simplifying service processing logic, and reduces difficulty of implementation.

Figure 3:
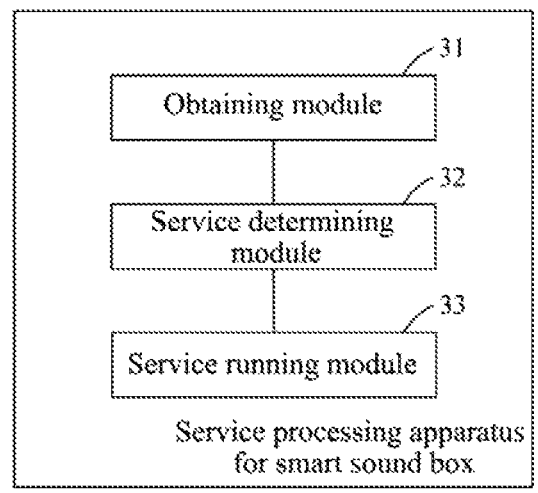
FIG. 3 is a schematic structural diagram of a service processing apparatus for a smart sound box according to an embodiment of the present disclosure.

FIG. 3 is a schematic structural diagram of a service processing apparatus for a smart sound box according to an embodiment of the present disclosure. The service processing apparatus for the smart sound box provided in this embodiment is configured to execute the service processing method for the smart sound box provided in the embodiment shown in FIG. 2. As shown in FIG. 3, the service processing apparatus for the smart sound box provided in this embodiment can include:

an obtaining module 31, configured to obtain a service running request instruction;

a service determining module 32, configured to determine, according to the service running request instruction, a first service that the service running request instruction instructs to run; and a service running module 33, configured to, if the smart sound box runs a second service in foreground and the first service is different from the second service, obtain a service type of the first service and a service type of the second service, and control, according to the service type of the first service and the service type of the second service, the smart sound box to run at least one of the first service and the second service.

Optionally, the service running module is specifically configured to:

control, according to the service type of the first service, the service type of the second service, and a correspondence between a preset service type and a service running mode, the smart sound box to run at least one of the first service and the second service.

Optionally, the service type includes at least two of the following:

a video service type for indicating a service for playing video;

an audio service type for indicating a service for playing audio;

a query service type for indicating a service for playing a query result; and a trigger service type for indicating a service that is automatically run in the foreground after a preset service running condition is triggered.

Optionally, if the service type of the first service and the service type of the second service are any one of the video service type and the audio service type, or, if the service type of the first service is any one of the video service type, the audio service type and the query service type, and the service type of the second service is the query service type, the service running module 33 is specifically configured to:

stop running the second service, and run the first service in the foreground.

Optionally, if the service type of the first service is the query service type, and the service type of the second service is the video service type or the audio service type, the service running module 33 is specifically configured to:

convert the second service from being run in the foreground to being run in background;

start to run the first service, and control the smart sound box to output a service running result of the first service and then stop running the first service; and convert the second service from being run in the background to being run in the foreground.

Optionally, the service running module 33 is further configured to:

lower a playback volume of a sound emitting device of the smart sound box; and restore the playback volume of the sound emitting device.

Optionally, if the service type of the first service is the trigger service type, and the service type of the second service is the video service type, the audio service type or the query service type, the service running module 33 is specifically configured to:

convert the second service from being run in the foreground to being run in background in a cache way;

run the first service in the foreground, and control the smart sound box to output a service running result of the first service;

stop running the first service when a preset service stop running condition of the first service is satisfied; and convert the second service from being run in the background in the cache way to being run in the foreground.

Optionally, the service running module 33 is further configured to:

determine, according to a service type of a service that is run in the foreground of the smart sound box as well as a relationship between a preset service type and a service exit duration, a service exit duration corresponding to the service that is run in the foreground of the smart sound box; and if no instruction inputted by a user is obtained within the service exit duration, stop running the service that is run in the foreground of the smart sound box.

The service processing apparatus for the smart sound box provided in this embodiment is configured to execute the service processing method for the smart sound box provided in the embodiment shown in FIG. 2. Specific implementations and technical effects are similar, which will not be repeated here.

Figure 4:
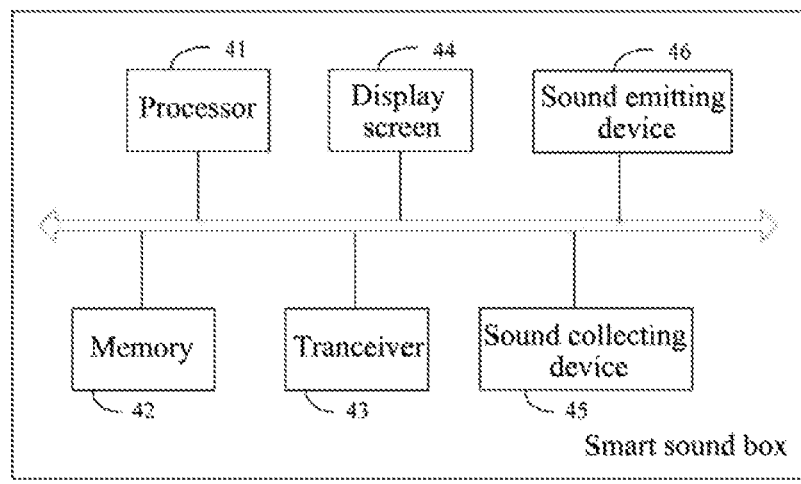
FIG. 4 is a schematic structural diagram of a smart sound box according to an embodiment of the present disclosure.

FIG. 4 is a schematic structural diagram of a smart sound box according to an embodiment of the present disclosure. As shown in FIG. 4, the smart sound box can include a processor 41 and a memory 42. The memory 42 is configured to store instructions, and the processor 41 is configured to execute the instructions stored in the memory 42, so that the smart sound box executes the service processing method for the smart sound box provided in the embodiment shown in FIG. 2. Specific implementations and technical effects are similar, which will not be repeated here. The smart sound box can further include a transceiver 43, a display screen 44, a sound collecting device 45, and a sound emitting device 46. The transceiver 43 is configured to communicate with other devices.

It will be appreciated by those of ordinary skill in the art that all or part of the steps to implement the above-described method embodiments may be accomplished by hardware related to program instructions. The aforementioned program may be stored in a computer readable storage medium. When the program is executed, the steps including those in the above-described method embodiments are performed. The foregoing storage medium includes various media that can store program codes, such as a ROM, a RAM, a magnetic disk, or an optical disc.

Finally, it should be noted that the above embodiments are merely intended to illustrate the technical solutions of the present disclosure, rather than limiting them. Although the present disclosure has been described in detail with reference to the foregoing embodiments, those of ordinary skill in the art will understand that it is still possible to modify the technical solutions described in the foregoing embodiments or to equivalently replace some or all of the technical features thereof. These modifications or substitutions do not preclude the nature of the respective technical solutions from the scope of the technical solutions of the embodiments of the present disclosure.

What is claimed is:

1. A service processing method for a smart sound box, comprising:
   obtaining a service running request instruction;
   determining, according to the service running request instruction, a first service that the service running request instruction instructs to run; and
   upon determining that the smart sound box runs a second service in foreground and the first service is different from the second service, obtaining a service type of the first service and a service type of the second service, and controlling, according to the service type of the first service, the service type of the second service, and a correspondence table between preset service types of a plurality of first services, preset service types of a plurality of second services and a plurality of service running modes, the smart sound box to run at least one of the first service and the second service;
   wherein the plurality of service running modes comprise at least two of: running in the foreground, running in background, running in background in a cache way, and stop running; the running in the foreground is that a service is being run and a service running result for the service is displayed on a display screen of the smart sound box, the running in the background is that a service is running but a service running result for the service is not displayed on the display screen of the smart sound box, the running in the background in the cache way is that a service is suspended but buffer data of the service is stored.

2. The method according to claim 1, wherein the service type comprises at least two of the following:
   a video service type for indicating a service for playing video;
   an audio service type for indicating a service for playing audio;
   a query service type for indicating a service for playing a query result; and
   a trigger service type for indicating a service that is automatically run in the foreground after a preset service running condition is triggered.

3. The method according to claim 2, wherein if the service type of the first service and the service type of the second service are any one of the video service type and the audio service type, or, if the service type of the first service is any one of the video service type, the audio service type and the query service type, and the service type of the second service is the query service type, the controlling the smart sound box to run at least one of the first service and the second service comprises: controlling the smart sound box to:
   stop running the second service, and run the first service in the foreground.

4. The method according to claim 2, wherein if the service type of the first service is the query service type, and the service type of the second service is the video service type or the audio service type, the controlling the smart sound box to run at least one of the first service and the second service comprises: controlling the smart sound box to:
   convert the second service from being run in the foreground to being run in background;
   start to run the first service, output a service running result of the first service and then stop running the first service; and
   convert the second service from being run in the background to being run in the foreground.

5. The method according to claim 4, wherein after the converting the second service from being run in the foreground to being run in background, the method further comprises:
   lowering a playback volume of a sound emitting device of the smart sound box;
   after the converting the second service from being run in the background to being run in the foreground, the method further comprises:
   restoring the playback volume of the sound emitting device.

6. The method according to claim 2, wherein if the service type of the first service is the trigger service type, and the service type of the second service is the video service type, the audio service type or the query service type, the controlling the smart sound box to run at least one of the first service and the second service comprises: controlling the smart sound box to:
   convert the second service from being run in the foreground to being run in background in a cache way;
   run the first service in the foreground, and output a service running result of the first service;
   stop running the first service when a preset service stop running condition of the first service is satisfied; and
   convert the second service from being run in the background in the cache way to being run in the foreground.

7. The method according to claim 1, wherein after the controlling, according to the service type of the first service and the service type of the second service, the smart sound box to run at least one of the first service and the second service, the method further comprises:

determining, according to a service type of a service that is run in the foreground of the smart sound box as well as a relationship between a preset service type and a service exit duration, a service exit duration corresponding to the service that is run in the foreground of the smart sound box; and if no instruction inputted by a user is obtained within the service exit duration, stopping running the service that is run in the foreground of the smart sound box.

8. A service processing apparatus for a smart sound box, comprising a memory and a processor:

wherein the memory is configured to store program instructions; the processor is configured to call the program instructions stored in the memory, and the processor is configured to:

obtain a service running request instruction;

determine, according to the service running request instruction, a first service that the service running request instruction instructs to run; and upon determining that the smart sound box runs a second service in foreground and the first service is different from the second service, obtain a service type of the first service and a service type of the second service, and control, according to the service type of the first service, the service type of the second service, and a correspondence table between preset service types of a plurality of first services, preset service types of a plurality of second services and a plurality of service running modes, the smart sound box to run at least one of the first service and the second service;

wherein the plurality of service running modes comprise at least two of: running in the foreground, running in background, running in background in a cache way, and stop running; the running in the foreground is that a service is being run and a service running result for the service is displayed on a display screen of the smart sound box, the running in the background is that a service is running but a service running result for the service is not displayed on the display screen of the smart sound box, the running in the background in the cache way is that a service is suspended but buffer data of the service is stored.

9. The apparatus according to claim 8, wherein the service type comprises at least two of the following:

a video service type for indicating a service for playing video;

an audio service type for indicating a service for playing audio;

a query service type for indicating a service for playing a query result; and a trigger service type for indicating a service that is automatically run in the foreground after a preset service running condition is triggered.

10. The apparatus according to claim 9, wherein if the service type of the first service and the service type of the second service are any one of the video service type and the audio service type, or, if the service type of the first service is any one of the video service type, the audio service type and the query service type, and the service type of the second service is the query service type, the processor is configured to:

stop running the second service, and run the first service in the foreground.

11. The apparatus according to claim 9, wherein if the service type of the first service is the query service type, and the service type of the second service is the video service type or the audio service type, the processor is configured to:

convert the second service from being run in the foreground to being run in background;

start to run the first service, and control the smart sound box to output a service running result of the first service and then stop running the first service; and convert the second service from being run in the background to being run in the foreground.

12. The apparatus according to claim 11, wherein the processor is further configured to:

lower a playback volume of a sound emitting device of the smart sound box; and restore the playback volume of the sound emitting device.

13. The apparatus according to claim 9, wherein if the service type of the first service is the trigger service type, and the service type of the second service is the video service type, the audio service type or the query service type, the processor is configured to:

convert the second service from being run in the foreground to being run in background in a cache way;

run the first service in the foreground, and control the smart sound box to output a service running result of the first service;

stop running the first service when a preset service stop running condition of the first service is satisfied; and convert the second service from being run in the background in the cache way to being run in the foreground.

14. The apparatus according to claim 8, wherein the processor is further configured to:

determine, according to a service type of a service that is run in the foreground of the smart sound box as well as a relationship between a preset service type and a service exit duration, a service exit duration corresponding to the service that is run in the foreground of the smart sound box; and if no instruction inputted by a user is obtained within the service exit duration, stop running the service that is run in the foreground of the smart sound box.

15. A smart sound box, comprising a memory and a processor;

wherein the memory is configured to store program instructions;

the processor is configured to call the program instructions stored in the memory to implement the service processing method for the smart sound box according to claim 1.

16. A non-transitory storage medium, comprising a non-transitory readable storage medium and a computer program, wherein the computer program is used for implementing the service processing method for the smart sound box according to claim 1.

* * * * *